United States Patent
Liao

(10) Patent No.: US 10,021,349 B2
(45) Date of Patent: Jul. 10, 2018

(54) CONFERENCE MIGRATION METHOD, APPARATUS, AND SYSTEM

(71) Applicant: Huawei Technologies Co., Ltd., Shenzhen (CN)

(72) Inventor: Shuzhao Liao, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/426,372

(22) Filed: Feb. 7, 2017

(65) Prior Publication Data

US 2017/0150101 A1     May 25, 2017

Related U.S. Application Data

(63) Continuation of application No. PCT/CN2015/083467, filed on Jul. 7, 2015.

(30) Foreign Application Priority Data

Aug. 8, 2014 (CN) .......................... 2014 1 0391213

(51) Int. Cl.
*H04N 7/15* (2006.01)

(52) U.S. Cl.
CPC .................................. *H04N 7/152* (2013.01)

(58) Field of Classification Search
None
See application file for complete search history.

(56) References Cited

U.S. PATENT DOCUMENTS

| 7,774,011 B2* | 8/2010 | Sung | H04W 4/10 370/310 |
| 8,831,662 B2* | 9/2014 | Qi | H04W 4/00 370/260 |
| 2004/0042601 A1* | 3/2004 | Miao | H04M 3/567 379/202.01 |
| 2005/0213739 A1* | 9/2005 | Rodman | H04M 3/567 379/202.01 |

(Continued)

FOREIGN PATENT DOCUMENTS

| CN | 101159842 A | 4/2008 |
| CN | 101170674 A | 4/2008 |

(Continued)

OTHER PUBLICATIONS

Machine Translation and Abstract of Chinese Publication No. CN101159842, Apr. 9, 2008, 26 pages.

(Continued)

*Primary Examiner* — Creighton Smith
(74) *Attorney, Agent, or Firm* — Slater Matsil, LLP

(57) ABSTRACT

A conference migration method, apparatus, and system, where the method includes performing, by a first terminal, a first conference with a second terminal, sending, by the first terminal, a request to a server in order to acquire a uniform resource identifier (URI) of a second conference, sending, by the first terminal, a related parameter of the first conference to a multipoint control unit (MCU) of the second conference, and performing, by the first terminal, the second conference with the second terminal using the MCU of the second conference, where a related parameter of the second conference is same as the related parameter of the first conference.

14 Claims, 6 Drawing Sheets

(56) References Cited

U.S. PATENT DOCUMENTS

| | | | |
|---|---|---|---|
| 2006/0233120 A1 | 10/2006 | Eshel et al. | |
| 2007/0050448 A1* | 3/2007 | Gonen | H04N 7/152 709/204 |
| 2008/0056248 A1 | 3/2008 | Braudes et al. | |
| 2009/0116563 A1 | 5/2009 | Kawamura et al. | |
| 2010/0250679 A1* | 9/2010 | Wang | H04N 7/15 709/204 |
| 2011/0067091 A1* | 3/2011 | Chavez | H04L 63/0823 726/5 |
| 2012/0044838 A1 | 2/2012 | Yi et al. | |
| 2012/0163577 A1* | 6/2012 | Buford | H04L 12/1822 379/202.01 |
| 2012/0268549 A1 | 10/2012 | Yang et al. | |
| 2013/0088563 A1* | 4/2013 | Wu | H04N 7/15 348/14.07 |
| 2013/0242803 A1* | 9/2013 | Cicic | H04L 29/06326 370/254 |
| 2013/0290494 A1* | 10/2013 | Goudarzi | H04L 65/1046 709/219 |
| 2014/0104375 A1* | 4/2014 | Wang | H04L 12/1818 348/14.09 |
| 2014/0226537 A1* | 8/2014 | Kashimba | H04L 65/1069 370/261 |
| 2014/0327731 A1* | 11/2014 | Wang | H04N 7/15 348/14.09 |
| 2016/0198123 A1* | 7/2016 | Wamorkar | G06F 11/20 714/15 |
| 2017/0041962 A1* | 2/2017 | Patel | H04W 76/005 |
| 2017/0150101 A1 | 5/2017 | Liao | |
| 2017/0248915 A1* | 8/2017 | Oh | G03H 1/0005 |

FOREIGN PATENT DOCUMENTS

| | | |
|---|---|---|
| CN | 101510991 A | 8/2009 |
| CN | 101753339 A | 6/2010 |
| CN | 101778247 A | 7/2010 |
| CN | 101883342 A | 11/2010 |
| CN | 104135640 A | 11/2014 |
| KR | 20050066163 A | 6/2005 |

OTHER PUBLICATIONS

Machine Translation and Abstract of Chinese Publication No. CN101510991, Aug. 19, 2009, 26 pages.

Machine Translation and Abstract of Chinese Publication No. CN101753339, Jun. 23, 2010, 7 pages.

Machine Translation and Abstract of Chinese Publication No. CN104135640, Nov. 5, 2014, 12 pages.

Machine Translation and Abstract of Korean Publication No. KR100592592 corresponding to KR20050066163, Jun. 26, 2006, 19 pages.

"Series H: Audiovisual and Multimedia Systems, Infrastructure of audiovisual services—Transmission multiplexing and synchronization, Frame structure for a 64 to 1920 kbit/s channels in audiovisual teleservices," ITU-T, H.221, Mar. 2009, 58 pages.

"Erratum 1 (Jun. 2009) to Recommendation ITU-T H.242 (2004), System for establishing communication between audiovisual terminals using digital channels up to 2 Mbit/s," Covering Note, Jun. 26, 2009, 1 page.

"Series H: Audiovisual and Multimedia Systems, Infrastructure of audiovisual services—Communication procedures, Procedures for establishing communication between three or more audiovisual terminals using digital channels up to 1920 kbit/s," ITU-T, H.243, Oct. 2005, 64 pages.

"Series H: Audiovisual and Multimedia Systems, Infrastructure of Audiovisual services—Systems and terminal equipment for audio-visual services, Packet-based multimedia communications systems, Amendment 1: Use of Facility message to enable call transfer," ITU-T, H.323, Amendment 1, Mar. 2013, 8 pages.

"Series T: Terminals for Telematic Services, Data protocols for multimedia conferencing," ITU-T, T.120, Jan. 2007, 46 pages.

Foreign Communication From a Counterpart Application, European Application No. 15830222.4, Extended European Search Report dated May 31, 2017, 8 pages.

Foreign Communication From a Counterpart Application, Chinese Application No. 201410391213.1, Chinese Search Report dated Nov. 9, 2016, 2 pages.

Foreign Communication From a Counterpart Application, Chinese Application No. 201410391213.1, Chinese Office Action dated Nov. 18, 2016, 10 pages.

Foreign Communication From a Counterpart Application, PCT Application No. PCT/CN2015/083467, English Translation of International Search Report dated Oct. 10, 2015, 2 pages.

Foreign Communication From a Counterpart Application, PCT Application No. PCT/CN2015/083467, English Translation of Written Opinion dated Oct. 10, 2015, 6 pages.

* cited by examiner

CONFERENCE MIGRATION METHOD, APPARATUS, AND SYSTEM

CROSS-REFERENCE TO RELATED APPLICATIONS

This application is a continuation of International Patent Application No. PCT/CN2015/083467 filed on Jul. 7, 2015, which claims priority to Chinese Patent Application No. 201410391213.1, filed on Aug. 8, 2014. The disclosures of the aforementioned applications are hereby incorporated by reference in their entireties.

TECHNICAL FIELD

Embodiments of the present disclosure relate to the communications field, and in particular, to a conference migration method, apparatus, and system.

BACKGROUND

A video service is a multimedia service integrating information such as a voice, an image, and data together to perform long-distance transmission. A service provided by the video service is a video conference, which may include three types of content, an image, a voice, and data such that when persons at different places communicate with each other, a person can hear sound of another person, and can also see an image of the other person, thereby enhancing a sense of reality, a sense of intimacy, and a sense of immediacy of communication. The video service can be applied to such fields as military, politics, economy, education, and health, to make full use of its advantages of reality, high efficiency, and real-timeliness in order to provide people with simple, convenient and effective means of communication, management, collaborative decision-making, and the like.

A videoconferencing service is one of video services, and is a communication manner of holding a conference between two places or among multiple places by means of a video technology and device and using a transmission channel. In other approaches, a multipoint control unit (MCU) is a control core of a videoconferencing system. The terminals need to be controlled using the MCU when more than two terminals participate in a conference.

In some approaches, a point-to-point call or an MCU conference needs to be migrated to another MCU conference.

For example, a user A uses a terminal A, a user B uses a terminal B, and a user C uses a terminal C. The user A and the user B establish a point-to-point call between the terminal A and the terminal B. As shown in FIG. 1, when the user A and the user B are in conference, it is found that the user C also needs to participate in the conference. That is, the terminal A, the terminal B, and the terminal C need to join the same conference, that is, a two-point conference becomes a three-point conference. After the point-to-point call is established between the terminal A and the terminal B, the terminal A initiates a call to make the terminal C also join the conference, and then calls of the terminal A, the terminal B, and the terminal C are all transferred to an MCU multipoint conference. In this way, the terminal A, the terminal B, and the terminal C can have a conversation in the same conference.

Using a Session Initiation Protocol (SIP) call as an example, a procedure is shown in FIG. 2, and the procedure includes the following steps.

Step (1): Establishing a point-to-point call between the terminal A and the terminal B;

Step (2): Calling, by the terminal A, the terminal C after holding the call;

Step (3): Requesting, by the terminal A using a special merger uniform resource identifier (Merger URI) call, a SIP Server to schedule an MCU conference, and returning a corresponding conference URI to the terminal A;

Step (4): Instructing, by the terminal A using Refer, the terminal B to transfer the call to the conference URI;

Step (5): Calling, by the terminal A, the corresponding conference URI to join the MCU conference;

Step (6): Calling, by the terminal B, the corresponding conference URI to join the MCU conference;

Step (7): Releasing the call between the terminal A and the terminal B; and

Step (8): Similarly, instructing, by the terminal A, the terminal C to transfer the call to the conference URI, calling, by the terminal C, the corresponding conference URI to join the MCU conference, and releasing the call between the terminal A and the terminal C in order to implement that the terminal A, the terminal B, and the terminal C join the MCU conference together.

The technology of changing two points into three points provides a solution that to add a third point to a conference, two terminals in a point-to-point call migrate the conference to an MCU. However, the technology merely implements adding the terminals in the point-to-point call and a terminal of the third point to a same conference. For the terminal A and the terminal B, if an original conference is an encrypted conference, a newly-established conference may become an unencrypted conference. Consequently, experience in the point-to-point call cannot be kept consistent with experience in the MCU conference to which the original conference is migrated.

As processing capabilities of terminals are enhanced, some terminals have a Mini MCU function.

As shown in FIG. 3, a user A uses a terminal A having the Mini MCU function, a user B uses a terminal B, a user C uses a terminal C, and a user D uses a terminal D. The user A, the user B, and the user C need a remote video conversation. Therefore, a three-point conference is held on the terminal A having a Mini MCU. The terminal A, the terminal B, and the terminal C join the conference. In a discussion process, the user A, the user B, and the user C find that the user D also needs to participate in the conference. That is, the terminal A, the terminal B, the terminal C, and the terminal D need to join the same conference. However, a capability of the Mini MCU of the terminal A is limited, a resource is insufficient, and only three points can access the conference. In this case, the existing conference needs to be migrated to an MCU having a sufficient capability.

A conference is held on the terminal A having the Mini MCU function. The terminal A, the terminal B, and the terminal C join the Mini MCU conference. The terminal A initiates a call making the terminal D also join the conference, and then calls of the terminal A, the terminal B, the terminal C, and the terminal D are all transferred to an MCU multipoint conference. In this way, the terminal A, the terminal B, the terminal C, and the terminal D can have a discussion in the same conference. Specific steps are shown in FIG. 4.

Step (1): Holding, by the Mini MCU of the terminal A, a three-point conference, where the terminal A, the terminal B, and the terminal C join the conference.

Step (2): Calling, by the terminal A, the terminal D after holding the call.

Step (3): Requesting, by the terminal A using a special Merger URI call, a SIP Server to schedule an MCU conference, and returning a corresponding conference URI to the terminal A.

Step (4): Instructing, by the terminal A using Refer, the terminal B to transfer the call to the conference URI.

Step (5): Calling, by the terminal A, the corresponding conference URI to join the MCU conference.

Step (6): Calling, by the terminal B, the corresponding conference URI to join the MCU conference.

Step (7): Releasing the call between the terminal A and the terminal B.

Step (8): Similarly, instructing, by the terminal A, the terminal C and the terminal D to transfer the call to the conference URI, calling, by the terminal C and the terminal D, the corresponding conference URI to join the MCU conference, and releasing the call among the terminal A, the terminal C, and the terminal D.

In this way, the terminal A, the terminal B, the terminal C, and the terminal D join the MCU conference together.

In the foregoing procedure, an example in which the conference is held on the terminal having the Mini MCU function is used for description. Similarly, when an independent MCU cannot satisfy a requirement of a current conference because of an insufficient resource, similarly, a conference migration request may be initiated from a terminal side, to migrate the conference from the current MCU having an insufficient resource to another MCU having a sufficient resource.

The foregoing procedure provides a solution of migrating the conference on the Mini MCU to the MCU when the resource on the Mini MCU is insufficient. However, experience of a user participating in the conference after the migration cannot be kept consistent with that before the migration.

SUMMARY

Embodiments of the present disclosure provide a conference migration method, apparatus, and system that can conveniently implement conference migration, and can also migrate a related parameter of a conference.

According to a first aspect, a conference migration method is provided, where the method includes performing, by a first terminal, a first conference with a second terminal, sending, by the first terminal, a request to a server in order to acquire a URI of a second conference, sending, by the first terminal, a related parameter of the first conference to an MCU of the second conference, and performing, by the first terminal, the second conference with the second terminal using the MCU of the second conference, where a related parameter of the second conference is the same as the related parameter of the first conference.

In a first possible implementation manner of the first aspect, the related parameter of the first conference includes a static parameter of the conference and/or a dynamic parameter of the conference, where the static parameter of the conference includes one piece of the following information, a conference name, a conference time, or encryption information, and the dynamic parameter of the conference includes one piece of the following information, conference token management information or conference state information.

With reference to the first aspect or the first possible implementation manner of the first aspect, in a second possible implementation manner, the step of sending, by the first terminal, a related parameter of the first conference to an MCU of the second conference includes sending, by the first terminal, the related parameter of the first conference to the MCU of the second conference by adding the related parameter of the first conference to a call INVITE request.

With reference to the first aspect or the first possible implementation manner of the first aspect, in a third possible implementation manner, sending, by the first terminal, a related parameter of the first conference to an MCU of the second conference includes sending, by the first terminal, the related parameter of the first conference to the MCU of the second conference by adding the related parameter of the first conference to an extended SIP Message or SIP INFO.

With reference to the first aspect or the first possible implementation manner of the first aspect, in a fourth possible implementation manner, sending, by the first terminal, a related parameter of the first conference to an MCU of the second conference includes sending, by the first terminal, the related parameter of the first conference to the MCU of the second conference using a message carried in an individual conference control channel.

With reference to the first aspect or the first possible implementation manner of the first aspect, in a fifth possible implementation manner, performing, by a first terminal, a first conference with a second terminal includes directly performing, by the first terminal, the first conference with the second terminal, or performing, by the first terminal, the first conference with the second terminal using an MCU of the first conference.

According to a second aspect, a video terminal is provided, including a video input/output unit configured to acquire or output video data, an audio input/output unit configured to acquire or output audio data, a processor unit configured to process the audio and video data, and further including a sending unit configured to send a request to a server, acquire a URI of a second conference, and send a related parameter of a first conference to an MCU of the second conference.

In a first possible implementation manner of the second aspect, the related parameter of the first conference includes at least a static parameter of the conference and/or a dynamic parameter of the conference, where the static parameter of the conference includes one piece of the following information, a conference name, a conference time, or encryption information, and the dynamic parameter of the conference includes one piece of the following information, conference token management information or conference state information.

According to a third aspect, a conference migration method is provided, where the method includes receiving, by an MCU, a related parameter of a first conference that is sent by a first terminal, and creating, by the MCU, a second conference according to the related parameter of the first conference such that the first terminal performs the second conference with a second terminal using the MCU, and a related parameter of the second conference is kept consistent with the related parameter of the first conference.

In a first possible implementation manner of the third aspect, the related parameter of the first conference includes at least a static parameter of the conference and/or a dynamic parameter of the conference, where the static parameter of the conference includes one piece of the following information, a conference name, a conference time, or encryption information, and the dynamic parameter of the conference includes one piece of the following information, conference token management information or conference state information.

According to a fourth aspect, an MCU is provided, including a processor unit configured to process audio and video data, and further including a receiving unit configured to receive a related parameter of a first conference sent by a first terminal such that the processor unit creates a second conference according to the related parameter of the first conference, the first terminal performs the second conference with a second terminal using the MCU, and a related parameter of the second conference is kept consistent with the related parameter of the first conference.

According to a fifth aspect, a videoconferencing system is provided, including a video terminal, a transmission channel, and an MCU, where the video terminal is connected to the MCU using the transmission channel. The video terminal is configured to collect and send a live video image signal, an audio signal, and a related data signal that are of a site of a first conference to the transmission channel, send a request to a server, acquire a URI of a second conference, and send a related parameter of the first conference to a MCU of the second conference, and the MCU further includes a processor unit configured to process audio and video data, and a receiving unit configured to receive the related parameter of the first conference that is sent by the video terminal such that the processor unit creates the second conference according to the related parameter of the first conference, a first terminal performs the second conference with a second terminal using the MCU, and a related parameter of the second conference is kept consistent with the related parameter of the first conference.

In a first possible implementation manner of the fifth aspect, the related parameter of the first conference includes at least a static parameter of the conference and/or a dynamic parameter of the conference, where the static parameter of the conference includes one piece of the following information, a conference name, a conference time, or encryption information, and the dynamic parameter of the conference includes one piece of the following information, conference token management information or conference state information.

With reference to the fifth aspect or the first possible implementation manner of the fifth aspect, in a second possible implementation manner, sending a related parameter of the first conference to an MCU of the second conference includes sending, by the video terminal, the related parameter of the first conference to the MCU of the second conference by adding the related parameter of the first conference to a call INVITE request.

With reference to the fifth aspect or the first possible implementation manner of the fifth aspect, in a third possible implementation manner, the sending a related parameter of the first conference to an MCU of the second conference includes sending, by the video terminal, the related parameter of the first conference to the MCU of the second conference by adding the related parameter of the first conference to a SIP Message or SIP INFO signaling.

With reference to the fifth aspect or the first possible implementation manner of the fifth aspect, in a fourth possible implementation manner, sending a related parameter of the first conference to an MCU of the second conference includes sending, by the video terminal, the related parameter of the first conference to the MCU of the second conference using a message carried in an individual conference control channel.

In the present disclosure, a related parameter of an original conference is sent to an MCU of a newly-created conference such that the newly-created conference may continue to use the related parameter of the original conference. Experience of a participant after the migration is kept consistent with that before the migration. The participant does not perceive conference switching, thereby reducing impact of the conference migration on the participant, and conference experience is better.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
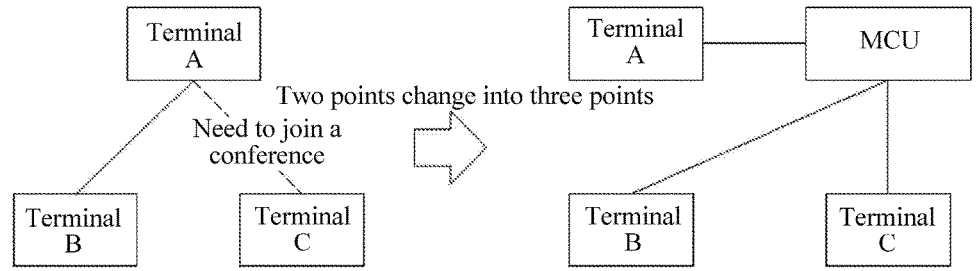
FIG. 1 is a schematic diagram of a system architecture.
Figure 2:
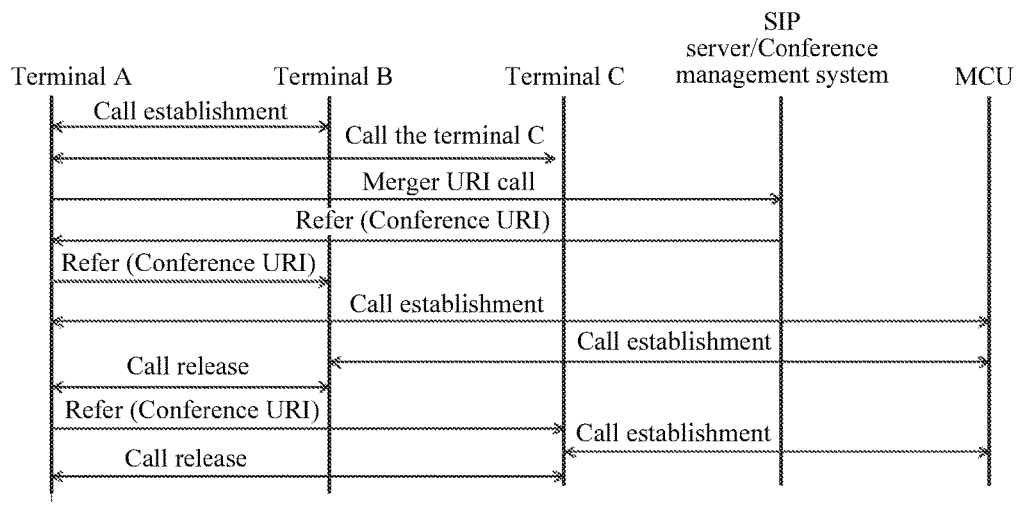
FIG. 2 is a schematic flowchart of a conference migration method.
Figure 3:
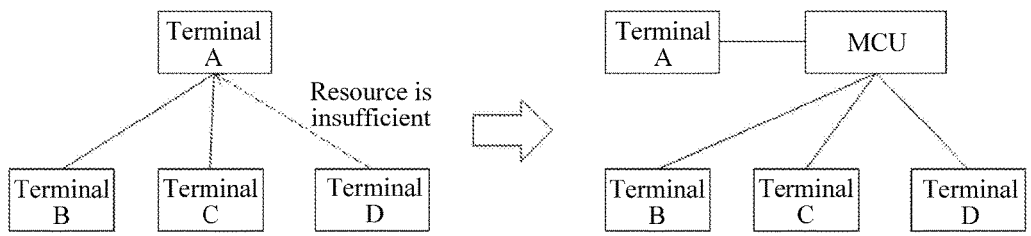
FIG. 3 is a schematic diagram of another system architecture.
Figure 4:
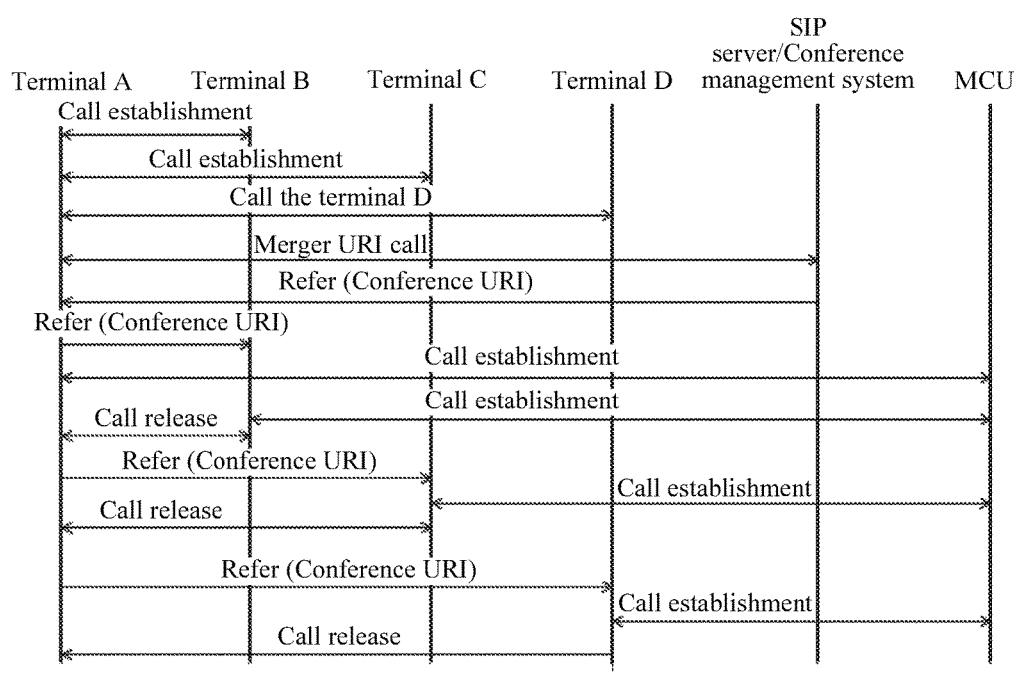
FIG. 4 is a schematic flowchart of another conference migration method.
Figure 5:
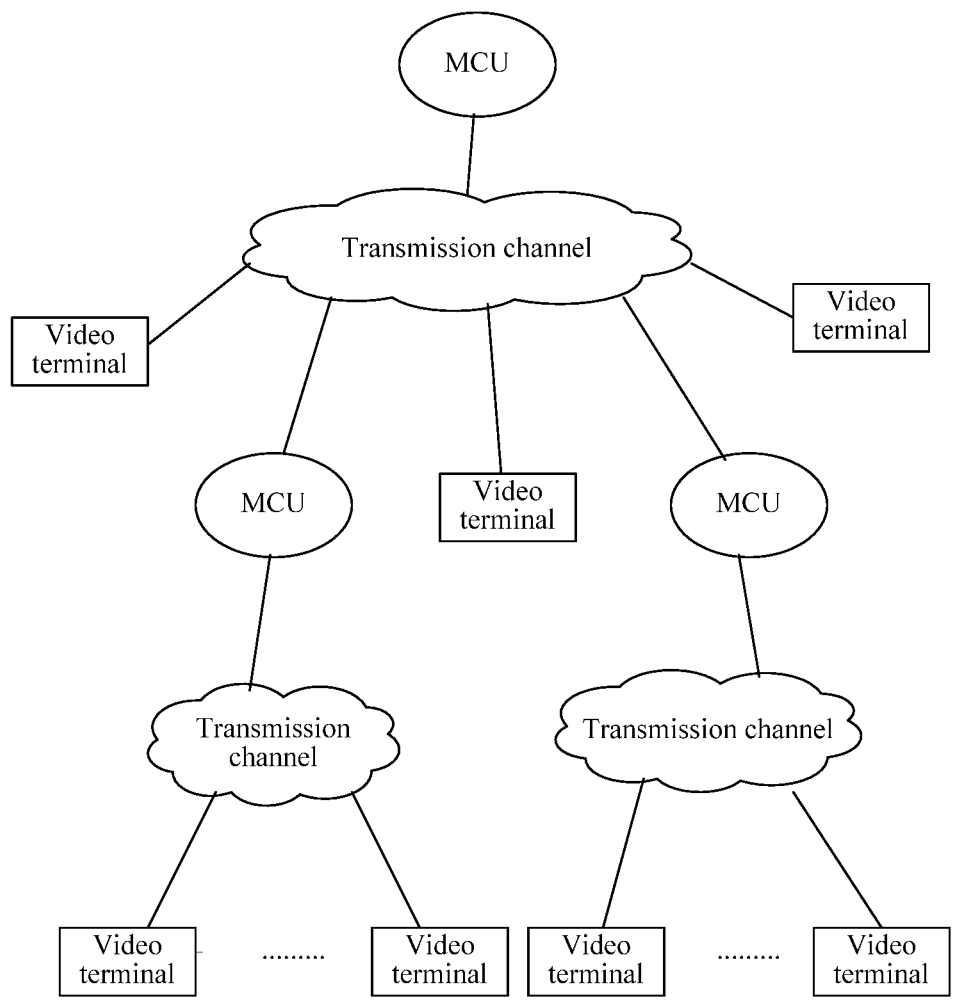
FIG. 5 is a schematic diagram of a system architecture according to Embodiment 1 of the present disclosure.

As shown in FIG. 5, a videoconferencing system provided in Embodiment 1 of the present disclosure includes several parts such as a video terminal (also referred to as a videoconferencing terminal), a transmission channel, and an MCU, and additionally, may further include a registration server (not drawn in the figure), which is configured for registration management of the video terminal. The video terminal is connected to the MCU using the transmission channel, and is configured to perform remote interaction with a participant.

Generally, the video terminal is directly operated by a user, to provide an input/output of signals such as a video signal, an audio signal, and a data signal. A function of the video terminal is to collect, compress, encode, and multiplex a live video image signal, an audio signal, and a related data signal that are of a conference site, and then send the signals to the transmission channel. In addition, received videoconferencing signals are classified and decoded, to be restored to an image signal, a voice signal and a data signal of a receiving site. The video terminal may further transfer a conference control signal (for example, requesting floor and requesting mastership) of the current site to the MCU, and in addition, further needs to execute a control instruction of the MCU.

Physical structures of multiple video terminals presented in FIG. 5 are similar. The following merely uses one of the video terminals as an example for description.

Figure 6:
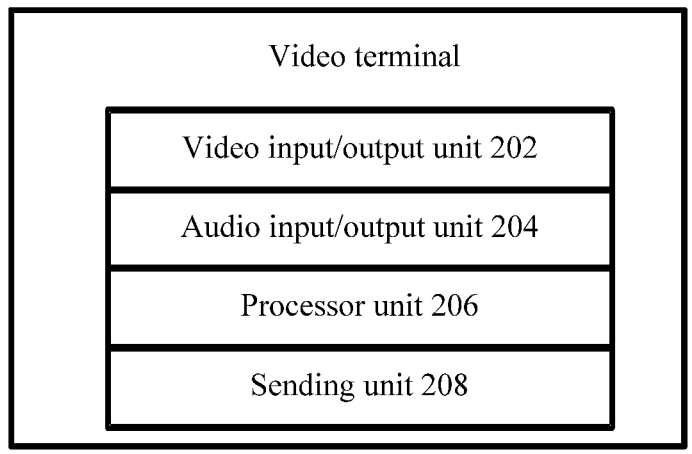
FIG. 6 is a schematic structural diagram of a video terminal according to Embodiment 1 of the present disclosure.

As shown in FIG. 6, the video terminal includes a video input/output unit 202, an audio input/output unit 204, a processor unit 206, and a sending unit 208. In addition, the video terminal may further be optionally equipped (not shown) with peripherals such as an audio mixer, a power amplifier, a large screen, and an electronic whiteboard according to service requirements of different users. The video input/output unit 202 is configured to acquire or output video data. The audio input/output unit 204 is configured to acquire or output audio data. The processor unit 206 is configured to process the audio and video data. The sending unit 208 is configured to send a request to a server, acquire a URI of a second conference, and send a related parameter of a first conference to an MCU of the second conference such that the MCU of the second conference can perform the second conference according to the related parameter of the first conference.

Figure 7:
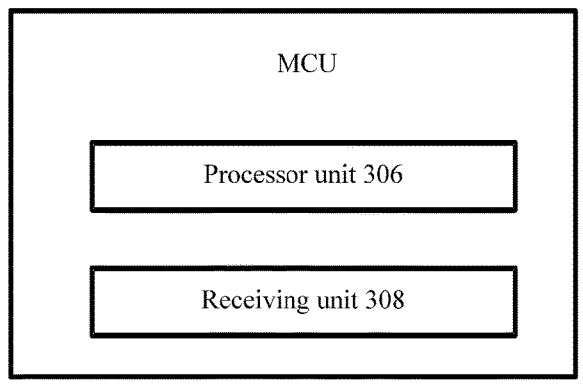
FIG. 7 is a schematic structural diagram of a MCU according to Embodiment 1 of the present disclosure.

A structure of the MCU is shown in FIG. 7, including a processor unit 306 and a receiving unit 308. The processor unit 306 is configured to process audio and video data. The receiving unit 308 is configured to receive the related parameter of the first conference sent by the video terminal such that the processor unit 306 creates the second conference according to the related parameter of the first conference, a first terminal performs the second conference with a second terminal using the MCU, and a related parameter of the second conference is kept consistent with the related parameter of the first conference.

Embodiment 2

Figure 8:
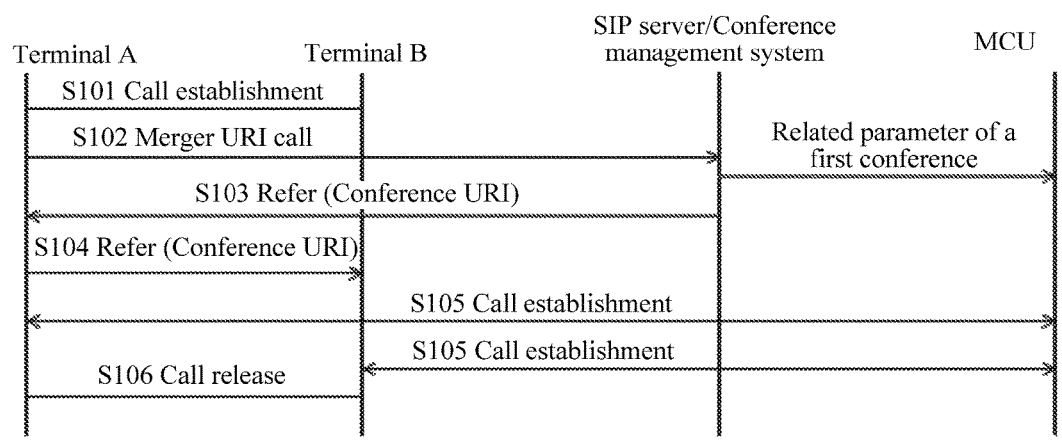
FIG. 8 is a schematic flowchart of a method according to Embodiment 2 of the present disclosure.

As shown in FIG. 8, a conference migration method provided in this embodiment of the present disclosure includes the following steps.

Step 101: A terminal A and a terminal B establish a call, to perform a first conference, where the call is directly established using the terminal A when the terminal A has a Mini MCU function, and the call is established using an MCU of the first conference when the terminal A has no Mini MCU function.

Figure 9:
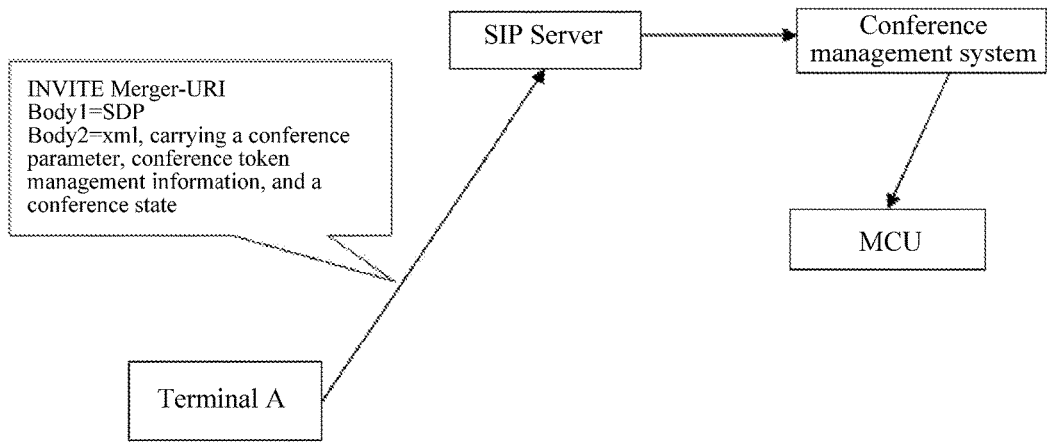
FIG. 9 is a schematic diagram of a system architecture according to Embodiment 2 of the present disclosure.

Step 102: The terminal A requests, using a special Merger URI call, a SIP Server and/or a conference management system to schedule an MCU conference, where the Merger URI call refers to that the terminal A migrates a conference by initiating an INVITE request. As shown in FIG. 9, two message bodies are carried in the INVITE request initiating the conference migration, where one message body is a media parameter used when the terminal A based on a Session Description Protocol (SDP) joins the conference, and the other message body is an extended SIP Message or SIP INFO, which carries a related parameter of the first conference (an original conference), where the related parameter includes a static parameter of the conference and/or a dynamic parameter of the conference. The static parameter of the conference includes one piece of the following information, a conference name, a conference time, or encryption information, and the dynamic parameter of the conference includes one piece of the following information, conference token management information or conference state information. An Extensible Markup Language (XML) manner or another similar manner is used for a format of the related parameter.

Step 103: After receiving the INVITE request of the Merger URI call, the SIP Server allocates a URI of a second conference according to the request, returns the uniform resource identifier of the second conference to the terminal A, and forwards the related parameter of the first conference that is carried in the message bodies of the INVITE request in step 102 to an MCU of the second conference, where the MCU of the second conference controls the second conference according to the related parameter of the first conference.

A related parameter of the second conference (a destination conference) is kept consistent with the related parameter of the first conference (the original conference), which includes the following.

(1) A static parameter of the newly-scheduled MCU conference is kept consistent with that of the original conference.

For example, the newly-scheduled MCU conference is also an encrypted conference if the original conference is an encrypted conference, and the newly-scheduled MCU conference is also an unencrypted conference if the original conference is an unencrypted conference.

(2) Token management of the newly-scheduled MCU conference is kept consistent with that of the original conference.

For example, the new MCU conference also locks the terminal A as the presentation token owner if the terminal A is a presentation token owner in the original conference. That is, in the newly-scheduled MCU conference, when the terminal A does not join the conference or the terminal A already joins the conference but has not become the presentation token owner yet, another terminal cannot apply for a presentation token, and another terminal can apply for the presentation token only after the terminal A joins the conference and actively releases the presentation token.

For another example, the newly-scheduled MCU conference also locks the terminal B as the chair token owner if the terminal B is a chair token owner in the original conference. That is, in the newly-scheduled MCU conference, when the terminal B does not join the conference or the terminal B already joins the conference but has not become the chair token owner yet, another terminal cannot apply for a chair token, and another terminal can apply for the chair token only after the terminal B joins the conference and actively releases the chair token.

In implementation, the newly-scheduled MCU may compulsively endow a token owner with a token after the locked token owner joins the conference at a site, or after joining the conference at the site, the token owner actively applies for a token, and before this, the MCU needs to reject application for the token at another site.

(3) A conference state of the newly-scheduled MCU conference is kept consistent with that of the original conference.

For example, the newly-scheduled MCU conference is also in the voice activation state if the original conference is in a voice activation state, and the newly-scheduled MCU conference is also in the state of the broadcast site C if the original conference is in a state of a broadcast site C.

Step 104: The terminal A instructs, using Refer, the terminal B to transfer the call to the conference URI.

Step 105: The terminal A and the terminal B separately call the corresponding conference URI, to join the MCU conference.

Step 106: Release the original call between the terminal A and the terminal B.

In this embodiment, a system based on a SIP protocol is described. A person skilled in the art may easily extend the system to a system based on an H.323 protocol or another similar protocol.

Embodiment 3

Figure 10:
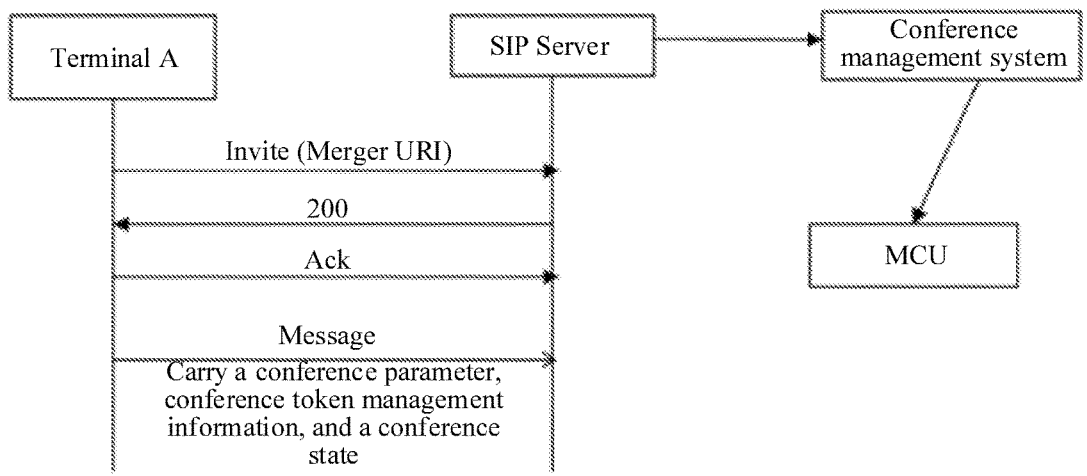
FIG. 10 is a schematic diagram of a system architecture according to Embodiment 3 of the present disclosure.

Referring to FIG. 10, a conference migration method provided in this embodiment of the present disclosure includes the following steps.

Step 101: A terminal A and a terminal B establish a call, to perform a first conference.

Step 102a: The terminal A requests, using a special Merger URI call, a SIP Server to schedule an MCU conference, where the Merger URI call refers to that the terminal A migrates a conference by initiating an INVITE request. The SIP Server replies with 200, and the Merger URI call is established between the terminal A and the SIP Server. A SIP Message or SIP INFO sent by the terminal A carries a related parameter of the first conference (an original conference), where the related parameter includes a static parameter of the conference and/or a dynamic parameter of the conference. The static parameter of the conference includes a conference name, a conference time, encryption information, or the like, and the dynamic parameter of the conference includes conference token management information or conference state information. An XML manner or another similar manner is used for a format of the related parameter.

Step 103: After receiving the INVITE request of the Merger URI call, the SIP Server allocates a conference URI of a second conference according to the request, returns the conference URI of the second conference to the terminal A, and forwards the related parameter of the first conference that is carried in message bodies of the INVITE request in step 102a to an MCU of the second conference, where the MCU of the second conference controls the second conference according to the related parameter of the first conference.

A related parameter of the newly-scheduled second conference (a destination conference) is kept consistent with the related parameter of the first conference (the original conference).

Step 104: The terminal A instructs, using Refer, the terminal B to transfer the call to the conference URI.

Step 105: The terminal A and the terminal B separately call the corresponding conference URI, to join the MCU conference.

Step 106: Release the original call between the terminal A and the terminal B.

In this embodiment, the Message and the Info message are used as an example. Obviously, the related parameter of the first conference may also be carried in a message of another type.

Embodiment 4

Figure 11:
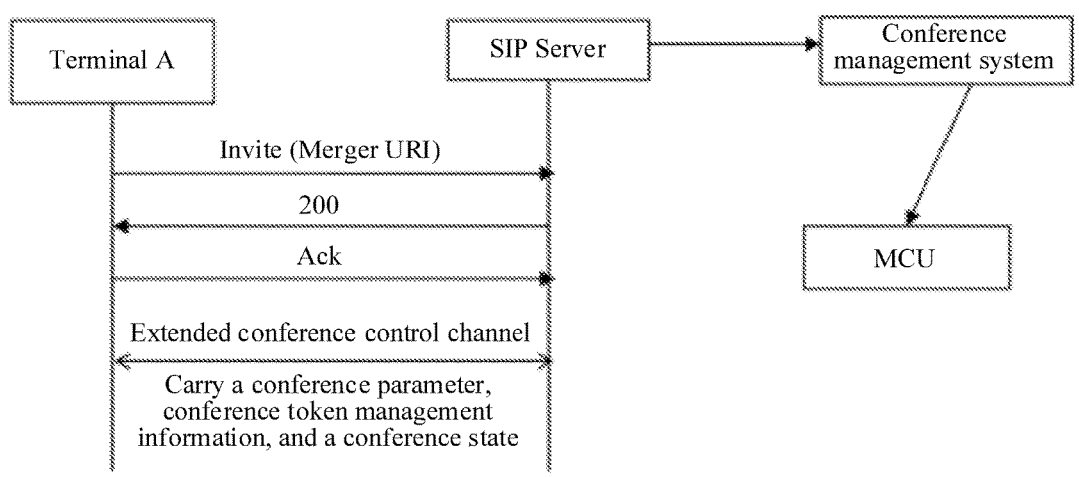
FIG. 11 is a schematic diagram of a system architecture according to Embodiment 4 of the present disclosure.

Referring to FIG. 11, a conference migration method in this embodiment of the present disclosure includes the following steps.

Step 101: A terminal A and a terminal B establish a call, to perform a first conference.

Step 102b: The terminal A requests, using a special Merger URI call, a SIP Server to schedule an MCU conference, where the Merger URI call refers to that the terminal A migrates a conference by initiating an INVITE request. The SIP Server replies with 200, and the Merger URI call is established between the terminal A and the SIP Server. The terminal A and the SIP Server may extend an individual conference control channel by means of SDP negotiation, where the conference control channel may be a similar Binary Floor Control Protocol (BFCP) channel, or may be a multiplexing Real-time Transport Control Protocol (RTCP) channel. A related parameter of the first conference is carried using a message carried in the extended conference control channel, and an XML manner or another manner is used for a format of the related parameter.

Step 103: After receiving the INVITE request of the Merger URI call, the SIP Server allocates a conference URI of a second conference according to the request, returns the conference URI of the second conference to the terminal A, and forwards the related parameter of the first conference that is carried in message bodies of the INVITE request in step 102b to an MCU of the second conference, where the MCU of the second conference controls the second conference according to the related parameter of the first conference.

A related parameter of the second conference is kept consistent with the related parameter of the first conference.

Step 104: The terminal A instructs, using Refer, the terminal B to transfer the call to the conference URI.

Step 105: The terminal A and the terminal B separately call the corresponding conference URI, to join the MCU conference.

Step 106: Release the original call between the terminal A and the terminal B.

As can be seen from the foregoing embodiments, in the present disclosure, a related parameter of an original conference is sent to an MCU of a newly-created conference such that the newly-created conference may continue to use the related parameter of the original conference. Experience of a participant after the migration is kept consistent with that before the migration. The participant does not perceive conference switching, thereby reducing impact of the conference migration on the participant, and conference experience is better.

By means of the conference migration, a requirement of a user on a resource may be flexibly satisfied. A point-to-point call may be made as much as possible without using an MCU. A Mini MCU is used as much as possible when the Mini MCU can be used. A conference is dynamically switched to an MCU having a sufficient resource only when a current resource cannot satisfy the requirement in order to improve resource utilization.

In addition, when a current conference resource is redundant, for example, when ten participants access an originally-held conference at the beginning, some participants cease participating in the conference during the conference, and in fact, only five participants access the conference, the conference may be migrated from an MCU of a relatively high capability (supporting more than ten parties) to an MCU of a relatively low capability (supporting five parties) in order to release a redundant MCU resource, thereby avoiding conference resource waste.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and no further details are provided herein.

In the several embodiments provided in this application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The functions may be stored in a computer-readable storage medium when the functions are implemented in the form of a software functional unit and sold or used as an independent product. Based on such an understanding, the technical solutions of the present disclosure essentially, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A conference migration method, comprising:
    performing, by a first terminal, a first conference with a second terminal;
    sending, by the first terminal, a request to a server in order to acquire a uniform resource identifier (URI) of a second conference;
    adding, by the first terminal, a related parameter of the first conference to a message carried in an individual conference control channel which is between the first terminal and the server;
    sending, by the first terminal, the message to a multipoint control unit (MCU) of the second conference via the server; and
    performing, by the first terminal, the second conference with the second terminal using the MCU of the second conference, wherein a related parameter of the second conference is same as the related parameter of the first conference;
    wherein the related parameter of the first conference comprises one of a conference name, a conference time, or encryption information.

2. The method according to claim 1, wherein the related parameter of the first conference comprises a static parameter of the first conference and a dynamic parameter of the first conference, wherein the static parameter of the first conference comprises one of the conference name, the conference time, or the encryption information, and
    wherein the dynamic parameter of the first conference comprises one of conference token management information or conference state information.

3. The method according to claim 1, wherein the related parameter of the first conference comprises a static parameter of the first conference comprising the conference name.

4. The method according to claim 1, wherein the related parameter of the first conference comprises a static parameter of the first conference comprising the conference time.

5. The method according to claim 1, wherein the related parameter of the first conference comprises a static parameter of the first conference comprising the encryption information.

6. The method according to claim 1, wherein the related parameter of the first conference comprises a dynamic parameter of the first conference comprising conference token management information.

7. The method according to claim 1, wherein the related parameter of the first conference comprises a dynamic parameter of the first conference comprising conference state information.

8. A video terminal, comprising:
    a video input/output configured to acquire or output video data;
    an audio input/output coupled to the video input/output and configured to acquire or output audio data;
    a processor coupled to the video input/output and the audio input/output and configured to process the audio data and video data; and
    a transmitter coupled to the processor and configured to:
        send a request to a server;
        acquire a uniform resource identifier (URI) of a second conference;
        add a related parameter of the first conference to a message carried in an individual conference control channel which is between the first terminal and the server; and
        send the message via the server to a multipoint control unit (MCU) of the second conference;
    wherein the related parameter of the first conference comprises one of a conference name, a conference time, or encryption information.

9. The video terminal according to claim 8, wherein the related parameter of the first conference comprises a static parameter of the first conference and a dynamic parameter of the first conference, wherein the static parameter of the first conference comprises one of the conference name, the conference time, or the encryption information, and
   wherein the dynamic parameter of the first conference comprises one of the following information: conference token management information or conference state information.

10. A conference migration method, comprising:
   receiving, by a multipoint control unit (MCU), a related parameter of a first conference sent by a first terminal, wherein the related parameter of the first conference is added to the message carried in an individual conference control channel which is between the first terminal and the server; and
   creating, by the MCU, a second conference according to the related parameter of the first conference such that the first terminal performs the second conference with a second terminal using the MCU, wherein a related parameter of the second conference is kept consistent with the related parameter of the first conference;
   wherein the related parameter of the first conference comprises one of a conference name, a conference time, or encryption information.

11. The method according to claim 10, wherein the related parameter of the first conference comprises a static parameter of the first conference and a dynamic parameter of the first conference, wherein the static parameter of the first conference comprises one of the conference name, the conference time, or the encryption information, and
   wherein the dynamic parameter of the first conference comprises one of the following information: conference token management information or conference state information.

12. A multipoint control unit (MCU), comprising:
   a processor configured to process audio and video data; and
   a receiver coupled to the processor and configured to receive a related parameter of a first conference sent by a first terminal such that the processor creates a second conference according to the related parameter of the first conference, wherein the related parameter of the first conference is added to a message carried in an individual conference control channel which is between the first terminal and the server, wherein the first terminal performs the second conference with a second terminal using the MCU, and wherein a related parameter of the second conference is kept consistent with the related parameter of the first conference;
   wherein the related parameter of the first conference comprises one of a conference name, a conference time, or encryption information.

13. A videoconferencing system, comprising:
   a video terminal;
   a transmission channel connected to the video terminal; and
   a multipoint control unit (MCU) connected to the video terminal using the transmission channel,
   wherein the video terminal is configured to:
      collect and send a live video image signal, an audio signal, and a related data signal of a site of a first conference to the transmission channel;
      send a request to a server;
      acquire a uniform resource identifier (URI) of a second conference;
      add a related parameter of the first conference to a message carried in an individual conference control channel which is between the first terminal and the server; and
      send the message to an MCU of the second conference via the server, and
   wherein the MCU comprises:
      a processor;
      a non-transitory computer-readable storage medium storing a program to be executed by the processor, the program including instructions to process audio and video data; and
      a receiver coupled to the processor and configured to receive the message sent by the video terminal such that the processor creates the second conference according to the related parameter of the first conference, wherein a first terminal performs the second conference with a second terminal using the MCU, and wherein a related parameter of the second conference is kept consistent with the related parameter of the first conference;
   wherein the related parameter of the first conference comprises one of a conference name, a conference time, or encryption information.

14. The videoconferencing system according to claim 13, wherein the related parameter of the first conference comprises a static parameter of the first conference and a dynamic parameter of the first conference, wherein the static parameter of the first conference comprises one of the following information: the conference name, the conference time, or the encryption information, and
   wherein the dynamic parameter of the first conference comprises one of the following information: conference token management information or conference state information.

* * * * *